US012583692B2

(12) United States Patent (10) Patent No.: US 12,583,692 B2
Iattoni et al. (45) Date of Patent: Mar. 24, 2026

(54) DEVICE FOR PICKING UP PRODUCTS STACKED ON PALLETS AND METHOD FOR PICKING UP PRODUCTS STACKED ON PALLETS

(71) Applicant: FLEXLINK SYSTEMS S.P.A., Rivoli (IT)

(72) Inventors: Vitaliano Iattoni, Rivoli (IT); Gianluca Ferlini, Rivoli (IT)

(73) Assignee: FLEXLINK SYSTEMS S.P.A., Rivoli (IT)

( * ) Notice: Subject to any disclaimer, the term of this patent is extended or adjusted under 35 U.S.C. 154(b) by 0 days.

(21) Appl. No.: 18/872,219

(22) PCT Filed: Jun. 5, 2023

(86) PCT No.: PCT/IB2023/055772
§ 371 (c)(1),
(2) Date: Dec. 5, 2024

(87) PCT Pub. No.: WO2023/238008
PCT Pub. Date: Dec. 14, 2023

(65) Prior Publication Data
US 2025/0361099 A1 Nov. 27, 2025

(30) Foreign Application Priority Data

Jun. 8, 2022 (IT) ........................ 102022000012140

(51) Int. Cl.
*B65G 47/91* (2006.01)
*B65G 59/04* (2006.01)
*B65G 61/00* (2006.01)
(52) U.S. Cl.
CPC ........... *B65G 47/912* (2013.01); *B65G 59/04* (2013.01); *B65G 61/00* (2013.01)

(58) Field of Classification Search
CPC ... B65H 5/08; B65H 5/10; B65H 5/14; B65G 57/04; B65G 47/766; B65G 2814/031;
(Continued)

(56) References Cited

U.S. PATENT DOCUMENTS 5,437,533 A * 8/1995 VanderMeer .......... B65G 57/11
414/789.5
5,815,963 A * 10/1998 Rauch ..................... D06F 67/04
38/143
(Continued)

FOREIGN PATENT DOCUMENTS

EP 2062838 A1 5/2009
EP 3831747 A1 * 6/2021 ........... B65G 59/005
(Continued)

OTHER PUBLICATIONS

ISR and Written Opinion issued by ISA/EPO in connection with PCT/IB2023/055772, dated Sep. 15, 2023, 13 pages.

*Primary Examiner* — Gregory W Adams
(74) *Attorney, Agent, or Firm* — Levenfeld Pearlstein, LLC

(57) ABSTRACT
A device for picking up products stacked on pallets comprises a receiving station configured to receive a pallet, an unloading station comprising a support surface, a transfer equipment movable between the receiving station and the unloading station and configured to pick up a separation sheet from the receiving station and deposit it in the unloading station. The transfer equipment comprising a plurality of grippers, wherein each gripper is configurable between a closed condition in which it grips the separation sheet made of flexible material and an open condition in which it releases the separation sheet made of flexible material. A main pusher is placed in the unloading station and is movable along the support surface following an active section of a first path.

12 Claims, 12 Drawing Sheets

(58) Field of Classification Search
  CPC ...... B65G 47/912; B65G 59/04; B65G 61/00;
  B65G 60/00; B65G 59/005; B65G
  57/005; B65G 59/02; B65G 47/5181;
  B65G 57/24
  USPC ....... 271/10.01; 414/225.01, 222.05, 222.01,
  414/416.05, 416.07, 789.9, 789.5, 789.8,
  414/791.4, 791.6, 795.9, 796.2, 796.8,
  414/798.9, 799
  See application file for complete search history.

(56)  References Cited

U.S. PATENT DOCUMENTS

| | | | | | |
|---|---|---|---|---|---|
| 5,844,807 | A | * | 12/1998 | Anderson ............ | B65G 57/245 |
| | | | | | 414/789.6 |
| 5,967,508 | A | * | 10/1999 | Olexy ...................... | B65H 5/10 |
| | | | | | 271/106 |
| 6,915,895 | B2 | * | 7/2005 | Morikazu ............ | B65G 59/026 |
| | | | | | 414/789 |
| 9,481,530 | B2 | * | 11/2016 | Brandmüller .......... | B65G 61/00 |
| 10,138,078 | B2 | * | 11/2018 | Martin ................... | B65G 47/91 |
| 10,501,273 | B2 | * | 12/2019 | Nishibun ................. | B65H 3/14 |
| 2013/0243558 | A1 | * | 9/2013 | Beer ................... | B65G 47/766 |
| | | | | | 198/469.1 |

FOREIGN PATENT DOCUMENTS

| | | | |
|---|---|---|---|
| EP | 3838815 | A1 | 6/2021 |
| KR | 101965141 | B1 | 4/2019 |
| WO | 2011135031 | A1 | 11/2011 |

* cited by examiner

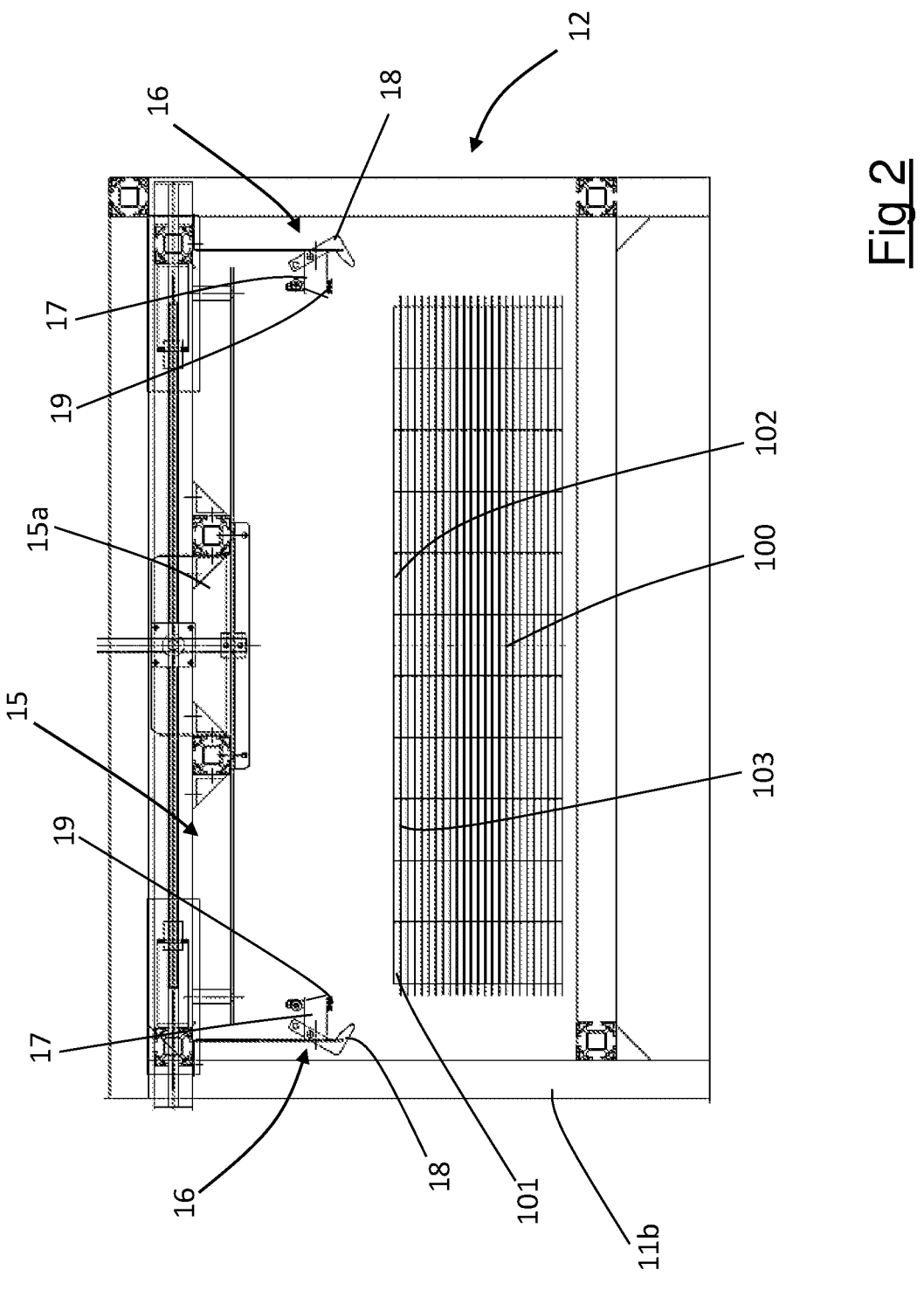
_Fig 2_

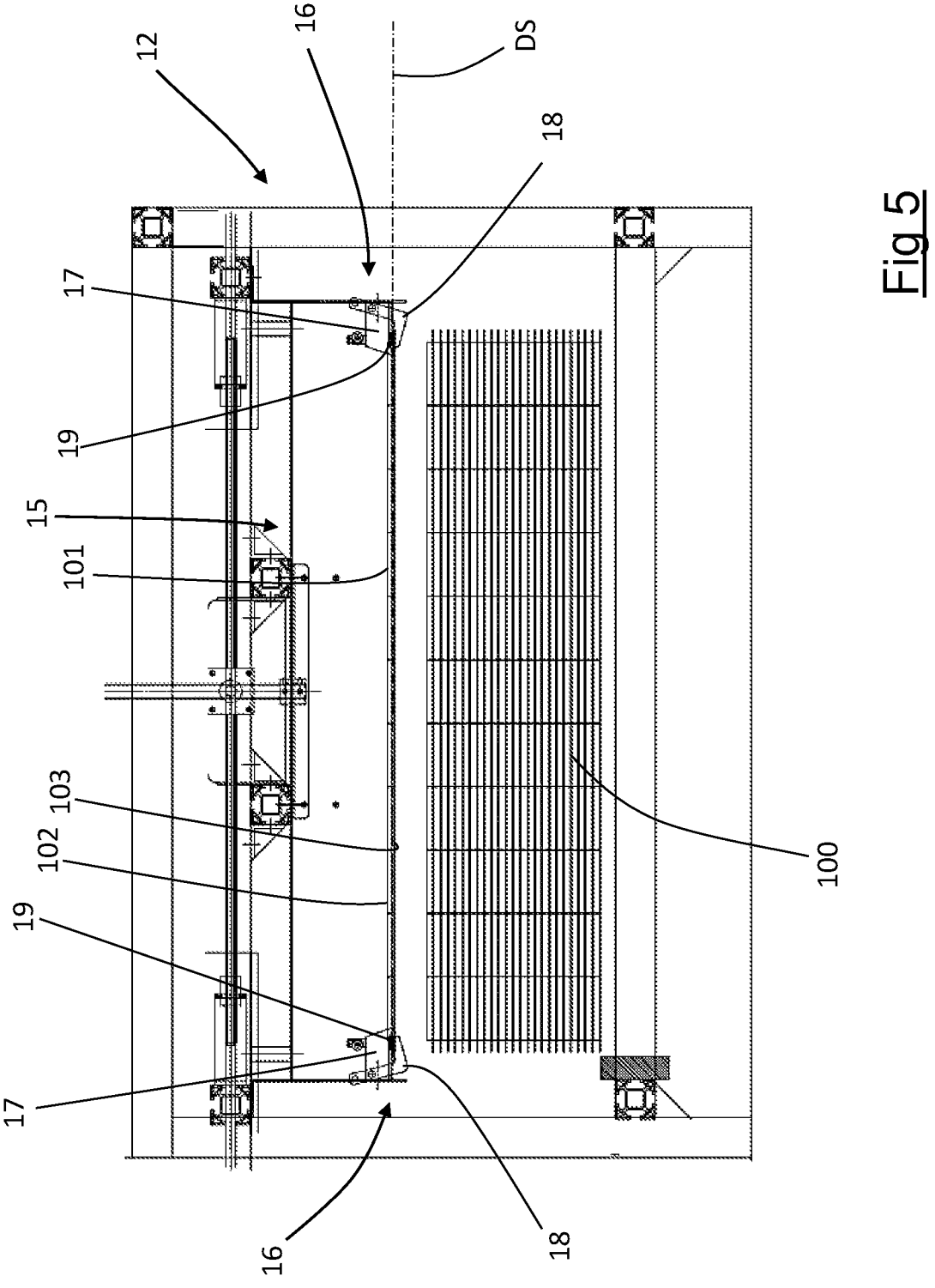
_Fig 5_

DEVICE FOR PICKING UP PRODUCTS STACKED ON PALLETS AND METHOD FOR PICKING UP PRODUCTS STACKED ON PALLETS

CROSS-REFERENCE TO RELATED APPLICATION DATA

This application is a U.S. National Stage Application of International Application No. PCT/IB2023/055772, filed Jun. 5, 2023, which claims the benefit of and priority to Italian Patent Application No. 102022000012140, filed Jun. 8, 2022 the disclosure of each is incorporated herein by reference in its entirety.

FIELD

The present invention relates to a device for picking up products stacked on pallets and method for picking up products stacked on pallets.

BACKGROUND

In some applications in the manufacturing sector, it is necessary to produce a plurality of finished or semi-finished products and then transfer these products to a remote position within the same or other plants to complete a production process.

Such applications may concern the manufacture of containers which, once made, are to be transferred to plants where they are filled or, which, once filled, are to be transferred to plants where they are packaged into individual units or pluralities of individual units for subsequent sale to the end user.

An example of such applications is the production, filling of containers with loose items (e.g. candies, sweets, pastilles and the like) and their subsequent packaging.

In this example, cylindrical containers are made which are then filled with the loose items and closed with opening and re-closing lids. These containers may be sent to plants where the containers are individually packaged or groups of containers are packaged for subsequent distribution to the sales network.

Typically, containers are transferred to packaging plants by stacking the containers on pallets and transporting the pallets to the destination plants.

SUMMARY

In the Applicant's experience, the containers are subjected to so-called palletising operations, which involve stacking the containers on pallets by arranging the containers in individual layers in a predetermined order, superimposed on each other and separated by a separation sheet made of flexible material, e.g. a cardboard sheet. The pallet thus prepared is wrapped with plastic film to allow the stack of container layers to be handled and transported.

The Applicant has verified that palletising operations are usually implemented using devices for the orderly depositing of containers on separation sheets made of flexible material. Such devices, in the Applicant's experience, comprise, for example, an anthropomorphic robotic arm equipped with a plurality of gripping heads arranged in a pre-determined array that pick up (e.g. by the use of suction cup devices) simultaneously one or more rows of containers and arrange the rows of containers side by side on a separation sheet made of flexible material in a pre-determined order and until a layer of containers is completed. An operator, or a special device, places a further separation sheet of flexible material on the formed layer of containers, and the anthropomorphic robotic arm positions a further layer of containers. This sequence of operations continues until a plurality of layers of containers are completely formed on the pallet.

When the formed pallets arrive at the destination plant, the plastic film wrapping is removed and each container is transferred from its respective layer to a conveyor belt that sends each container to a processing station, such as a packaging station.

The Applicant has noticed that often during the handling or transport of pallets, products (in the above example containers) of a layer of products may move between each other and with respect to the predetermined depositing order on the separation sheet made of flexible material, arranging themselves in a substantially random order on the separation sheets made of flexible material.

The Applicant has verified that when this happens, the picking operations of stacked products, so-called depalletising operations, cannot be carried out with picking devices similar to those used for palletising, as the latter require the products to be picked being arranged according to a pre-established pattern.

The Applicant has, for example, verified that the gripping heads of the anthropomorphic robotic arm are not capable of intercepting all products in a product layer because they are no longer arranged according to the original arrangement and are therefore no longer arranged in accordance with the pre-arranged array of gripping heads.

In the Applicant's experience, the picking operations of products that may be displaced from the initial palletising order are therefore usually carried out by assigned operators, with the consequence that the depalletising process cannot be automated.

However, the Applicant has perceived the need to automate the depalletising process even when the products to be depalletised are arranged in a random order.

The Applicant has perceived that separation sheets made of flexible material could be used as temporary supports for the layers of products and that each layer of products could be slid along the respective separation sheet made of flexible material to depalletise the products.

However, the Applicant has perceived that the separation sheet made of flexible material, by its very nature, does not have sufficient structural rigidity to support by itself and without excessive deformation the products placed on it, and that the separation sheet must therefore be supported during all depalletising operations.

The Applicant has found that gripping the edges of the separation sheet of flexible material with grippers makes it possible to remove the separation sheet with the layer of products on it from the pallet without the separation sheet deforming to such an extent that the products fall off the separation sheet.

The Applicant also has found that by transferring the separation sheet with the layer of products on it, while it is gripped, onto a support surface, it is possible to push the products along the separation sheet while the latter is supported by the support surface.

The present invention therefore concerns, in a first aspect thereof, a device for picking up products stacked on pallets.

Preferably, it is provided a receiving station configured to receive a pallet.

Preferably, it is provided an unloading station including a support surface.

Preferably, a transfer equipment is movable at least between the receiving station and the unloading station and configured to pick up a separation sheet made of flexible material from the receiving station and deposit it in the unloading station.

Preferably, said transfer equipment comprises a plurality of grippers.

Preferably, each gripper is configurable between a closed condition in which it grips the separation sheet made of flexible material and an open condition in which it releases the separation sheet made of flexible material.

Preferably, a main pusher is placed in the unloading station and is movable along the support surface following an active section of a first path.

The present invention relates, in a second aspect thereof, to a method for picking up products stacked on pallets.

Preferably, it is provided arranging a pallet in a receiving station with products arranged in layers superimposed on each other and divided by respective separation sheets made of flexible material.

Preferably, it is provided grasping a separation sheet made of flexible material with a layer of products placed on top of it.

Preferably, it is provided moving the separation sheet made of flexible material to an unloading station while the separation sheet made of flexible material is grasped.

Preferably, it is provided placing the separation sheet made of flexible material on a support surface of the unloading station.

Preferably, it is provided pushing the layer of products placed on the separation sheet made of flexible material along the support surface to remove them from the separation sheet made of flexible material.

The Applicant has verified that by retaining the separation sheet made of flexible material with the grippers, the separation sheet made of flexible material remains constrained at the gripping zones and therefore its deformation can be controlled, by selecting these gripping zones, while being moved from the pallet in such a way that the products placed on it do not fall off the separation sheet made of flexible material.

The Applicant has also verified that by moving the separation sheet made of flexible material onto the support surface, the separation sheet made of flexible material can lie on the support surface supported by it and assume, as a result of its own flexibility, a flat configuration that ensures that the main pusher can effectively intercept and remove all products placed on the separation sheet made of flexible material.

The Applicant has also verified that any displacements (other than those due to the transport of the pallet) of the products on the flexible separation sheet while the flexible separation sheet is being transferred to the unloading station do not adversely affect the operation of pushing the products along the support surface to remove them from the separation sheet made of flexible material.

In this description and the accompanying claims, "separation sheet made of flexible material" means a body in the form of a sheet that is capable of flexing at least when subjected to the weight of goods placed on it. Examples of a separation sheet made of flexible material could be a sheet made of corrugated cardboard, a sheet of paper or cardboard, a sheet of plastic material.

In this description and the appended claims, "vertical direction", "vertically" and similar expressions mean any direction perpendicular to said support surface.

In this description and the attached claims, "horizontal direction", "horizontally" and similar expressions mean any direction contained in a plane parallel to said support surface.

In this description and the appended claims, "stretching", when referring to a separation sheet made of flexible material, means the action of stretching the separation sheet made of flexible material by applying one or more tensile forces on the separation sheet made of flexible material directed along a horizontal plane.

In this description and in the appended claims, "superimposed" means placed above along a vertical direction.

The present invention may have, in all the aspects discussed above, at least one of the preferred features described below. Such features may therefore be present individually or in combination, except where expressly stated otherwise, either in the device of the first aspect of the present invention or in the method of the second aspect of the present invention.

Preferably, said main pusher is arranged parallel to said support surface and is spaced in a perpendicular direction from said support surface by a first distance when it travels along said active section of the first path.

Preferably, grasping the separation sheet made of flexible material comprises grasping the separation sheet made of flexible material at grasping areas.

Preferably, said grasping areas are placed on opposite edges of the separation sheet made of flexible material.

Preferably, each gripper comprises a first gripper body and a second gripper body movable towards each other to achieve said closed condition and movable away from each other to achieve said open condition.

Preferably, said first gripping body comprises at least one suction head.

Preferably, the suction head is switchable between a suction condition in which it adheres to the separation sheet made of flexible material and a release condition in which it does not adhere to the separation sheet made of flexible material.

Preferably, when said transfer equipment is in the receiving station, said grippers are movable between a position away from the separation sheet made of flexible material and a position adjacent to the separation sheet made of flexible material.

Preferably, the grippers are movable between the distanced position and the adjacent position by translating along a vertical direction preferably directed towards said pallet.

Preferably, each gripper can be movable along the vertical direction independently from the other grippers.

Preferably, a distance travelled by each gripper along the vertical direction between the distanced position and the adjacent position may be different from distances travelled by the other grippers along the vertical direction between the respective distanced positions and the respective adjacent positions, so as to take into account any misalignment with respect to a horizontal plane of the gripping zones of the separation sheet made of flexible material.

Preferably, grasping the separation sheet made of flexible material is preceded by lifting the separation sheet made of flexible material along a lifting direction at least at the grasping areas of the separation sheet made of flexible material.

Preferably, said lifting direction is a vertical direction directed away from said pallet.

Preferably, lifting the separation sheet made of flexible material along a lifting direction includes placing the first gripper body of each gripper on the separation sheet made of flexible material and switching the respective suction head to the suction condition.

Preferably, placing the first gripper body of each gripper on the separation sheet made of flexible material comprises moving the grippers to the adjacent position.

Preferably, in said adjacent position, the grippers are in the open condition and the suction head of the first gripper body of each gripper is placed in the suction condition.

Preferably, when in this adjacent position, the grippers are movable in the lifting direction until they reach a closing start position.

Preferably, said grippers are placed in the closed position in said closing start position.

Preferably, lifting along a lifting direction of the separation sheet made of flexible material comprises moving the grippers in the lifting direction with the suction heads in the suction condition.

Preferably, moving the grippers in the lifting direction is performed after placing the first gripper body of each gripper on the separation sheet made of flexible material.

Preferably, a lifting length of the grippers, measured in a vertical direction, from the adjacent position to the closing start position is at least such as to allow insertion of the second gripper body of each gripper between the lifted separation sheet made of flexible material and a separation sheet made of flexible material placed immediately below said lifted separation sheet made of flexible material.

Preferably, after lifting the separation sheet made of flexible material along a lifting direction, the second gripper bodies are inserted below the separation sheet made of flexible material and said grippers are closed.

Preferably, after closing said grippers, the suction heads are placed in the release condition.

Preferably, when in said closing start position the grippers are movable in a stretching direction.

Preferably, said stretching direction is horizontal.

Preferably, said plurality of grippers, when in the closed condition, are movable along a horizontally directed stretching direction.

Preferably, said stretching direction is substantially perpendicular to the lifting direction.

Preferably, grasping the separation sheet made of flexible material comprises stretching the separation sheet made of flexible material at least along the stretching direction.

Preferably, stretching the separation sheet made of flexible material is implemented after closing said grippers.

Preferably, when said plurality of grippers is in the closed condition, first gripper heads of each pair of grippers are moved horizontally away from second grippers of each pair of grippers.

Preferably, stretching the separation sheet made of flexible material includes moving active grippers away from each other along the stretching direction on opposite edges of the separation sheet made of flexible material.

Preferably, a stretching length, measured in the horizontal direction, is such that portions of the separation sheet made of flexible material are placed horizontally between two opposite gripping areas.

Preferably, the transfer equipment comprises four containment walls running along vertical planes.

Preferably, said containment walls are movable along a vertical direction to be arranged at the edges of the separation sheet made of flexible material.

Preferably, the containment walls are arranged at the edges of the separation sheet made of flexible material in such a way that they extend vertically above and below the edges of the separation sheet made of flexible material.

Preferably, arranging the containment walls at the edges of the separation sheet made of flexible material is implemented before lifting the separation sheet made of flexible material.

Preferably, moving the separation sheet made of flexible material to an unloading station while the separation sheet made of flexible material is grasped comprises moving the transfer equipment in a horizontal direction until it is above the support surface.

Preferably, the transfer equipment can be raised and lowered along a vertical direction when placed in the receiving station.

Preferably, the transfer equipment can be slidably coupled to crosspieces extending horizontally between the receiving station and the unloading station.

Preferably, the transfer equipment can be raised and lowered along a vertical direction when placed in the unloading station.

Preferably, depositing the separation sheet made of flexible material on the support surface of the unloading station comprises lowering the transfer equipment vertically towards the support surface.

Preferably, lowering the transfer equipment vertically towards the support surface is implemented up to a release distance from the support surface.

Preferably, said release distance measured in the vertical direction is at least such that the second gripper body of each gripper is disengaged from the separation sheet made of flexible material.

Preferably, when said transfer equipment is in the unloading station said grippers are movable between the closed condition and a suspended position of the separation sheet made of flexible material.

Preferably, in the suspended position the grippers are in the open condition and the first gripper body of each gripper is in contact with the separation sheet made of flexible material.

Preferably, at least in the suspended position, the suction head of the first gripper body of each gripper is placed in the suction condition.

Preferably, placing the grippers in the suspended position is implemented when the transfer equipment is at said release distance.

Preferably, depositing the separation sheet made of flexible material on the support surface comprises placing the separation sheet made of flexible material on the support surface with the grippers in the suspended position.

Preferably, when the separation sheet made of flexible material is resting on the support surface, the suction heads are switched to the release condition.

Preferably, after switching the suction heads to the release condition, it is provided moving vertically away the transfer equipment and the grippers from the support surface.

Preferably, said support surface comprises a retaining unit configured to retain the separation sheet made of flexible material on the support surface.

Preferably, said retaining unit is only active on a peripheral portion of the separation sheet made of flexible material.

Preferably, said retaining unit comprises a plurality of suction conduits open at a support surface of the support plane.

Preferably, it is provided retaining the separation sheet made of flexible material on said support surface after depositing the separation sheet made of flexible material on the support surface.

Preferably, pushing the layer of products is preceded by retaining the separation sheet made of flexible material on said support surface.

One or more products could, during the transport of the pallet or while moving the separation sheet made of flexible material, be superimposed on the products of the product layer placed on the separation sheet made of flexible material.

Preferably, in the case where one or more products are superimposed on said layer of products, pushing the layer of products is preceded by pushing said one or more products superimposed on said layer of products on said support surface.

Preferably, it is provided secondary pusher movable along the support surface following an active section of a second path.

Preferably, said active section of the second path is parallel to the active section of the first path.

Preferably, the active section of the second path is vertically superimposed on the active section of the first path.

Preferably, when the secondary pusher travels the active section of the second path, said secondary pusher is distanced in the perpendicular direction from the support surface by a second distance greater than said first distance.

Preferably, said second distance is chosen to be substantially equal to the height, in the vertical direction, of the products placed on the separation sheet made of flexible material.

Preferably, pushing said one or more products superimposed on said layer of products on said support surface is performed by moving the secondary pusher along the active section of the second path.

Preferably, the secondary pusher travels along the active section of the second path even when there are no products superimposed on said layer of products.

Preferably, the secondary pusher travels the active section of the second path before the main pusher travels the active section of the first path.

Preferably, the active section of the first path extends between a starting end and a finishing end.

Preferably, the active section of the second path extends between a starting and a finishing end.

Preferably, the starting end of the active section of the first path is placed at the retaining unit for the separation sheet made of flexible material.

Preferably, the starting end of the active section of the second path is vertically aligned above the starting end of the active section of the first path.

Preferably, the finishing end of the active section of the second path is vertically aligned above the finishing end of the active section of the first path.

Preferably, said secondary pusher is in said finishing end of the active section of the second path when the pusher is in said starting end of the active section of the first path.

Preferably, the first path extends in a closed loop.

Preferably, the first path comprises a return section that extends between the finishing end and the starting end of the active section.

Preferably, the second path extends in a closed loop.

Preferably, the second path comprises a return section that extends between the finishing end and the starting end of the active section.

Preferably, when the main pusher travels the active section of the first path, the secondary pusher travels the return section of the second path.

Preferably, it is provided providing a containment channel with a dimension in the direction perpendicular to the support surface that substantially coincides with a dimension, measured in the same direction, of the layer of products.

Preferably, it is provided a covering body placed parallel to the support surface and spaced in a perpendicular direction from the support surface by a third distance when the secondary pusher is at said finishing end of the active section of the second path.

Preferably, said third distance is equal to said second distance.

Preferably, said containment channel is made by said covering body.

Preferably, said covering body is movable along the support surface following an active section of a third path.

Preferably, the active section of the third path extends between a starting and a finishing end.

Preferably, the starting end of the active section of the third path coincides with the starting end of the active section of the second path.

Preferably, the finishing end of the active section of the third path coincides with the finishing end of the active section of the second path.

Preferably, the third path extends in a closed loop.

Preferably, the third path comprises a return section that extends between the finishing end and the starting end of the active section.

Preferably, the return section of the third path coincides with the return section of the second path.

Preferably, the covering body has an extension, measured along the third path, equal to the extension of the active section of the third path.

Preferably, the covering body comprises a first end and a second end.

The distance, measured along the third path, between the first end and the second end of the covering body is equal to the distance between the starting end and the finishing end of the active section of the third path.

Preferably, the covering body is placed between, and reaches, the starting end and the finishing end of the active section of the third path when the secondary pusher is in said finishing end of the active section of the second path.

Preferably, when the secondary pusher is in said finishing end of the active section of the second path, the first end of the covering body is placed at the finishing end of the active section of the third path.

Preferably, when the secondary pusher is at the end of the active section of the second path, the second end of the covering body is placed at the beginning end of the active section of the third path.

Preferably, when the main pusher travels along the active section of the first path, the second end of the covering body travels along the active section of the third path and the first end of the covering body travels along the return section of the third path.

Preferably, the second end of the covering body is integral with the main pusher and the first end of the covering body is integral with the secondary pusher.

Preferably, pushing the layer of products is preceded by performing the containment channel on the support surface.

Preferably, the covering body is configured to prevent one or more products from superimposing the product layer during the action of pushing products with the main pusher.

Preferably, two containment sidewalls are provided located at the support surface and extending parallel to an advancement direction of the main pusher.

Preferably, after removing the layer of arranged products from the separation sheet made of flexible material, it is provided removing the separation sheet made of flexible material from the support surface.

Preferably, the support surface comprises two half-parts that can be rotated about their respective horizontal and parallel axes of rotation.

Preferably, the support surface can be configured between a working condition in which the two half-parts are aligned and coplanar with each other and an open condition in which the two half-parts are rotated about their respective axes of rotation.

Preferably, the unloading station comprises a collection compartment underneath the support surface.

Preferably, when the support surface is in the working condition, the collection compartment is closed at the top of the support surface.

Preferably, when the support surface is in the open condition, the collection compartment is open at the top.

Preferably, removing of the separation sheet made of flexible material from the support surface is performed by placing the support surface in the open condition and dropping the separation sheet made of flexible material into the collection compartment.

Preferably, when the support surface is in the open condition, the retaining unit of the separation sheet made of flexible material is inactive.

Preferably, when the support surface is in the open condition, the main pusher is in the return section of the first path.

Preferably, when the support surface is in the open condition, the secondary pusher is in the return section of the second path.

Preferably, when the support surface is in the open condition, the covering body is in the return section of the third path.

Preferably, said products are containers, preferably filled with loose items.

Further features and advantages of the present invention will become clearer from the following detailed description of a preferred embodiment thereof, with reference to the appended drawings and provided by way of indicative and non-limiting example, in which:

BRIEF DESCRIPTION OF THE DRAWINGS

FIGS. 2 to 5 are schematic front views of a detail of FIG. 1 in different operating positions;

DETAILED DESCRIPTION

The representations in the appended figures need not necessarily be considered to scale and do not necessarily respect the proportions between the various parts.

Figure 1:
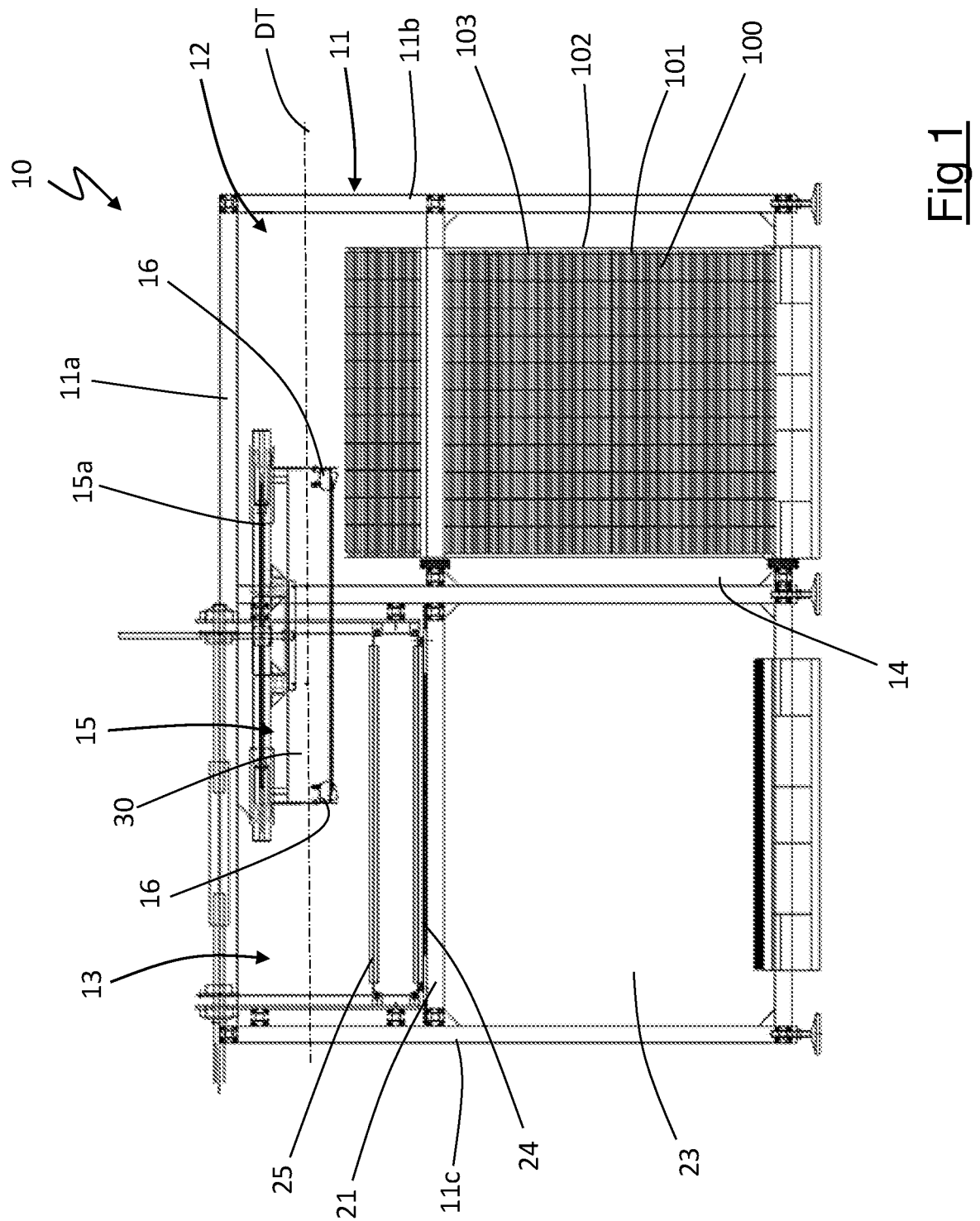
FIG. 1 is a schematic front view of a device for picking up products stacked on pallets in accordance with the present invention.

A device for picking up products stacked on pallets in accordance with the present invention is schematically shown in FIG. 1. The device for picking up products stacked on pallets is collectively referred to by reference number 10.

The device 10 comprises a frame 11 on which a receiving station 12 and an unloading station 13 are defined. The receiving station 12 and the unloading station 13 are arranged side by side.

The receiving station 12, illustrated to the left side in FIG. 1, comprises a storage compartment 14 for housing a pallet 100 on which a plurality of products 101 are stacked arranged in rows 102 separated from each other by respective separation sheets 103 made of flexible material.

The products 101 may, for example, be cylindrical containers. The separation sheets 103 made of flexible material may be corrugated cardboard sheets.

The device 10 comprises a transfer equipment 15 horizontally movable between the receiving station 12 and the unloading station 13 along a transfer direction DT (in FIG. 1, the transfer equipment 15 is shown in an intermediate position between the receiving station 12 and the unloading station 13). The transfer equipment 15 is also vertically movable both when arranged in the receiving station 12 and when arranged in the unloading station 13.

The transfer equipment 15 comprises a carriage 15a slidably coupled to a cross member 11a of the frame 11 along the transfer direction DT. The carriage 15a is also slidably coupled to uprights 11b of the frame 11 along a vertical direction when the transfer equipment 15 is in the receiving station 12. The carriage 15a is also slidably coupled to uprights 11c of the frame 11 along a vertical direction when the transfer equipment 15 is in the unloading station 13.

The transfer equipment 15 also includes four vertical containment walls 30 arranged perpendicular to each other two by two and movable with the transfer equipment 15.

The transfer equipment 15 comprises a plurality of grippers 16 movable with the transfer equipment 15. Each gripper 16 is also movable with respect to the transfer equipment 15 along a horizontal direction.

The grippers 16 are arranged in pairs in which each gripper 16 of a pair of grippers 16 faces the other gripper 16 of the same pair of grippers 16 along the transfer direction DT. Between two and six pairs of grippers 16, preferably between two and five pairs of grippers 16, plus preferably between two and four pairs of grippers 16, e.g. two or three pairs of grippers 16, are provided. In the embodiment shown in the appended figures, two pairs of grippers 16 are provided.

Figure 16:
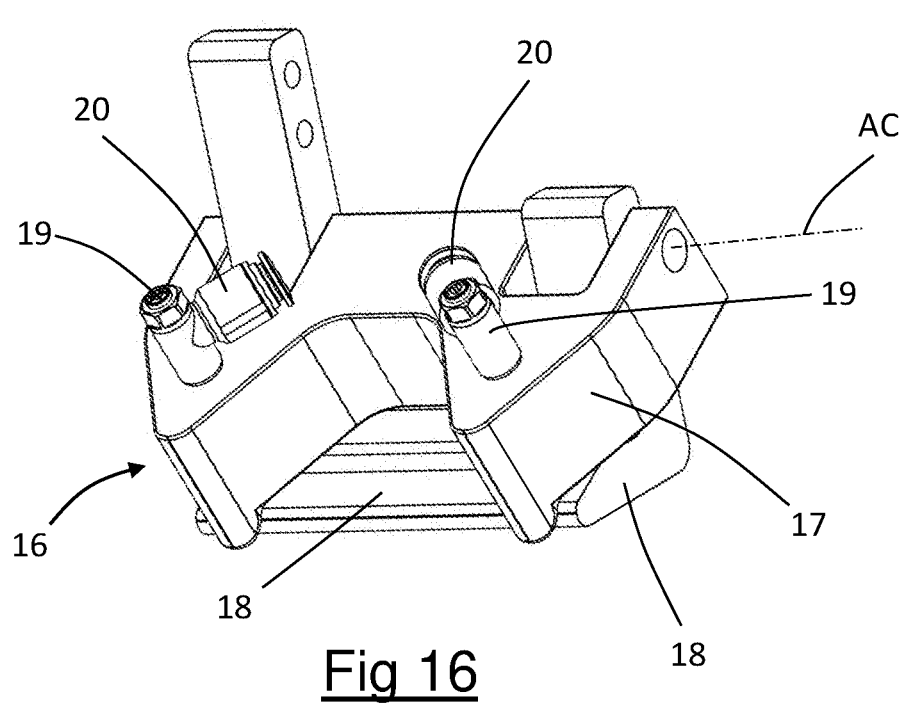
FIG. 16 is a schematic perspective view of a component of the device of FIG. 1.

As better illustrated in FIG. 16, each gripper 16 comprises a first gripper body 17 and a second gripper body 18. The second gripping body 18 can be rotated with respect to the first gripping body 17 around a hinge axis AC in such a way as to move towards and away from the first gripping body 17. When the first gripper body 17 is in substantial contact with the second gripper body 18 (as in the configuration shown in FIG. 16), the gripper is in a closed condition. When the first gripper body 17 is moved away from the second gripper body 18 (as in the configuration shown in FIG. 16), the gripper is in an open condition.

The first gripper body 17 of each gripper 16 comprises two suction heads 19 connected to a pneumatic circuit (not shown) via respective connectors 20. The suction heads 19 are configured to create a depression by realising a suction condition and to be at ambient pressure by realising a release condition.

The device 10 includes, at the unloading station 13, a support surface 21. The support surface 21 is switchable between a working position and an open position. The support surface 21 comprises two half-parts 21*a*, 21*b* (FIG. 17) each hinged to the frame 10. In the working condition, the two half-parts 21*a*, 21*b* are coplanar and are arranged according to a horizontal plane. In the open condition, the two half-parts 21*a*, 21*b* are rotated relative to each other, creating an unloading opening 22. Underneath the support surface 21 there is a collection compartment 23. Unless otherwise specified, reference will be made to the support surface 21 in the working condition.

Figures 9, 10:
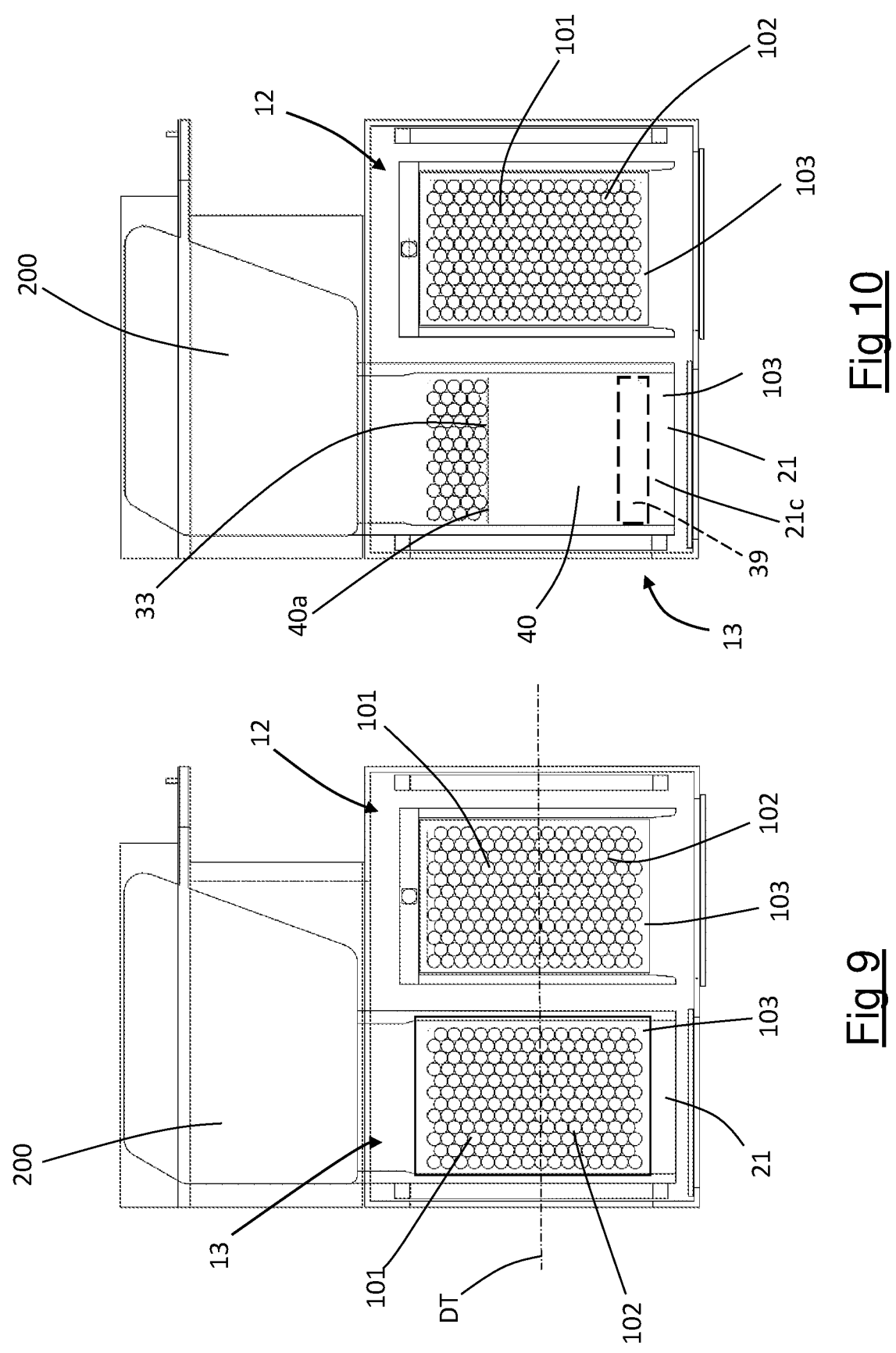
FIGS. 9 and 10 are schematic views from above of the device of FIG. 1 in the operating positions of FIGS. 7 and 8, respectively.

The support surface 21 comprises a retaining unit 39 located at an initial portion 21*c* of the support surface 21 (in FIG. 10 the retaining unit 39 has been depicted in a broken line). The retaining unit 39 is active in a direction parallel to the transfer direction DT along the entire initial portion 21*c* of the support surface 21.

In a possible embodiment, the retaining unit 39 may comprise a plurality of suction ducts (not illustrated) open at the support surface 21. Alternatively, the retaining unit 39 may comprise a plurality of suction cups (not illustrated) placed on the support surface 21. Alternatively, the retaining unit 39 may comprise a plurality of clamps (not illustrated) active on the support surface 21.

The device 10 comprises, at the unloading station 13, a main pusher 24 movable along a first path 25.

Figure 6:
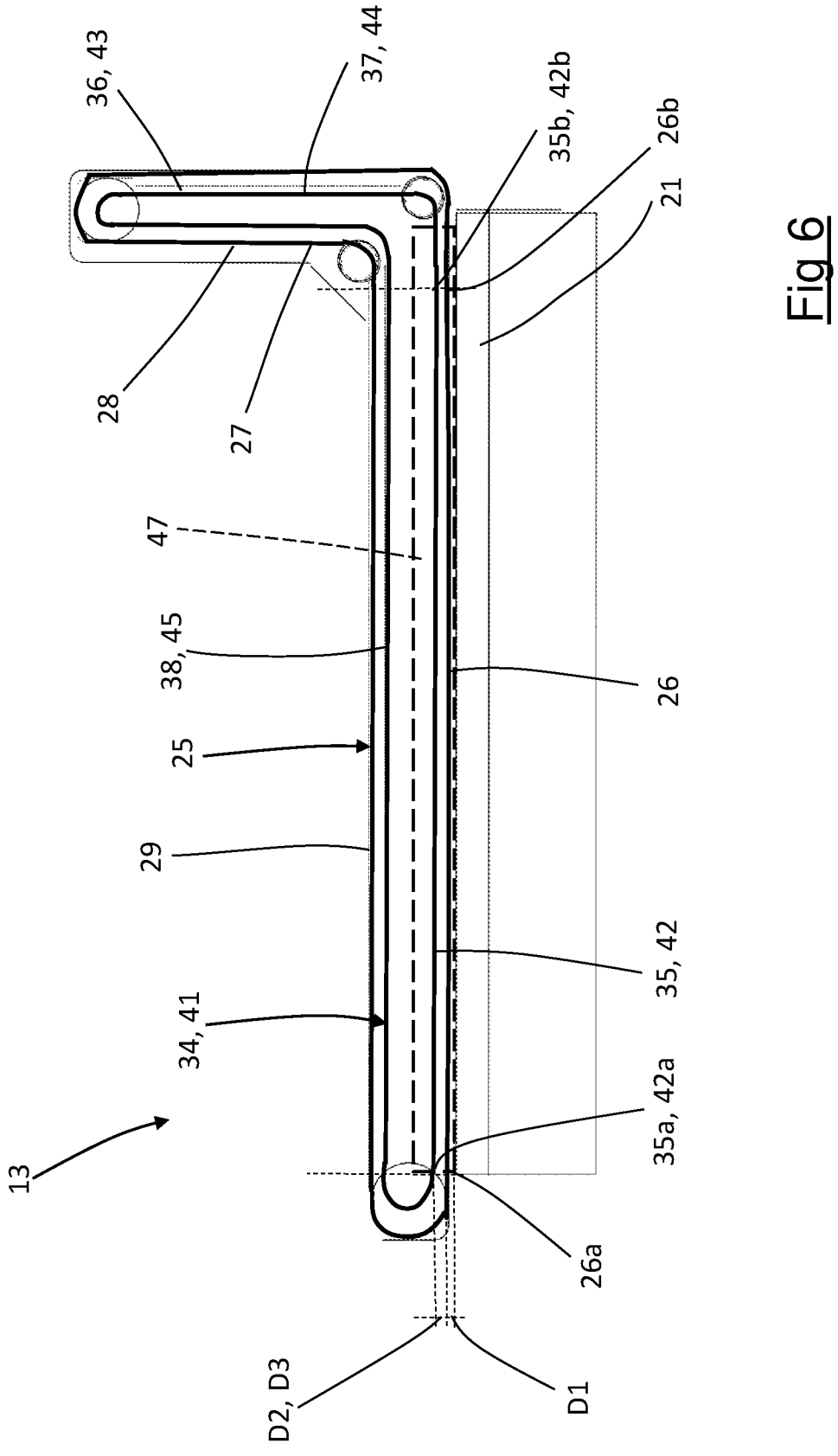
FIG. 6 is a front schematic view of a further detail of FIG. 1.

As shown in FIG. 6, the first path 25 is a closed path. The first path 25 comprises an active section 26 that extends substantially parallel to the support surface 21.

The active section 26 of the first path 25 comprises a starting end 26*a* and a finishing end 26*b*. The first path 25 also comprises a return section 27 that extends between the finishing end 26*a* and the starting end 26*a* of the active section 26. The return section 27 comprises a first portion 28 and a second portion 29. The first portion 28 of the return section 27 extends vertically along two parallel branches and is adjacent to the finishing end 26*b* of the active section 26. The second portion 29 of the return section 27 is substantially parallel and vertically superimposed on the active section 26. The main pusher 24 is spaced in a perpendicular direction from the support surface 21 by a first distance D1 when it travels along the active section 26. The distance D1 is less than the height in the vertical direction of a product 101.

The main pusher 24 is arranged transversely to the transfer direction DT. The main pusher 24 is connected to two mutually parallel chains 31 (only one chain 31 is visible in the figures) located laterally to the support surface 21 and transversally to the main pusher 24. The chains 31 are wound around pulleys 32 of which at least one is motorised. The chains 31 are closed on the pulleys 32 and are placed parallel to the first path 25. The main pusher 24 follows the first path 25 transported by the chains 31.

The main pusher 24 is comprised of a profile preferably with a U-shaped cross-section.

The device 10 also comprises, at the unloading station 13, a secondary pusher 33 movable along a second path 34.

As shown in FIG. 6, the second path 34 is a closed path. The second path 34 comprises an active section 35 that extends substantially parallel to the support surface 21. The active section 35 of the second path 34 comprises a starting end 35*a* and a finishing end 35*b*. The second path 34 further comprises a return section 36 which extends between the finishing end 35*a* and the starting end 35*b* of the active section 35. The return section 36 comprises a first portion 37 and a second portion 38. The first portion 37 of the return section 36 extends vertically along two parallel branches and is adjacent to the finishing end 35*b* of the active section 35. The second portion 38 of the return section 36 is substantially parallel and vertically superimposed on the active section 35. The secondary pusher 33 is spaced in a perpendicular direction from the support surface 21 by a second distance D2 when it travels along the active section 35. The distance D2 is greater than the height in the vertical direction of a product 101 and less than twice the height in the vertical direction of a product 101.

The second path 34 is parallel to the first path 25 and internal to the first path 25.

The secondary pusher 33 is parallel to the main pusher 24. The secondary pusher 33 is arranged transversely to the transfer direction DT. The secondary pusher 24 is also connected to the chains 31. The secondary pusher 33 follows the second path 34 transported by the chains 31. The main pusher 24 and the secondary pusher 33 are permanently connected to the chains 31 and are spaced from each other along the chains 31. The distance along the second path 34 between the main pusher 24 and the secondary pusher 33 is substantially equal to the length of the active section 35 of the second path 34.

The secondary pusher 33 consists of a profile preferably with a U-shaped cross-section.

The device 10 also comprises a covering body 40 at the unloading station 13. The covering body 40 is movable along a third path 41.

As shown in FIG. 6, the third path 41 is a closed path. The third path 41 comprises an active section 42 that extends substantially parallel to the support surface 21. The active section 42 of the third path 41 comprises a starting end 42*a* and a finishing end 42*b*. The third path 41 further comprises a return section 43 that extends between the finishing end 42*a* and the starting end 42*b* of the active section 42. The return section 43 comprises a first portion 44 and a second portion 45. The first portion 44 of the return section 43 extends vertically along two parallel branches and is adjacent to the finishing end 42*b* of the active section 42. The second portion 45 of the return section 43 is substantially parallel and vertically superimposed on the active section 42. The covering body 40 is spaced in a perpendicular direction from the support surface 21 by a third distance D3 when it travels along the active section 42.

As shown schematically in FIG. 6, the third path 41 coincides with the second path 34. The third distance D3 coincides with the second distance D2. The third path 41 is parallel to the first path 25 and is internal to the first path 25.

The covering body 40 is parallel to the main pusher 24. The covering body 40 is arranged transversely to the transfer direction DT. The covering body 40 is also connected to the chains 31. The covering body 40 follows the third path 41 transported by the chains 31. The covering body 40 is permanently connected to the chains 31 and extends between the secondary pusher 33 and the main pusher 24.

The covering body 40 comprises a first end 40*a* and a second end 40*b*. The first end 40*a* is substantially located at the secondary pusher 33 and the second end 40*b* is substantially located at the main pusher 24. The distance along the third path 41 between the first end 40a and the second end 40b is essentially equal to the length of the active section 42 of the third path 41.

The covering body 40 comprises a plurality of battens 46 that form a kind of shutter. Each batten is connected to the chains 31. A starting batten defines the first end 40a of the covering body 40 and a finishing batten defines the second end 40b of the covering body 40. When the covering body 40 is arranged in the active section 42 of the third path 41, the covering body 40 creates, in combination with the support surface 21, a containment channel 47.

Each batten 46 is comprised of a profile preferably having a U-shaped cross-section. The battens 46 are spaced from each other along the third path 41 by amounts less than the width in the horizontal direction of the products 101.

The device 10 comprises, at the unloading station 13, two containment sidewalls 48 (of which only one is shown with a broken line in FIG. 6) located at the support surface 21.

The containment sidewalls 48 extend vertically and are parallel to a forward direction of the main pusher 24.

The device 10 is adjacent to a product conveyor 200. Such a conveyor 200 may be part of the device 10 or may be a separate device with respect to the device 10. The conveyor 200 may be a conveyor belt, an organiser or the assembly of a conveyor belt and an organiser.

A method for picking up products stacked on pallets in accordance with the present invention can be implemented with the device 10 described above.

Referring explicitly to the device 10, the method for picking up products stacked on pallets in accordance with the present invention involves arranging a pallet 100 in the storage compartment 14 of the receiving station 12.

The pallet 100 is arranged with rows 102 of products 101 resting on respective separation sheets 103 made of flexible material. Each separation sheet 103 made of flexible material is superimposed on a layer 102 of products 101 arranged on another separation sheet 103 made of flexible material.

The transfer equipment 15 is placed in the receiving station above the pallet 100 with the grippers 16 in the open condition, as shown schematically in FIG. 2. The suction heads 19 are in the release condition. The grippers 16 and transfer equipment 15 are in a distanced position from the pallet 100.

The grippers 16 are lowered vertically, together with the transfer equipment 15 towards the pallet 100. The grippers 16 in the open condition, and the suction heads 19 are in the release condition.

Figure 3:
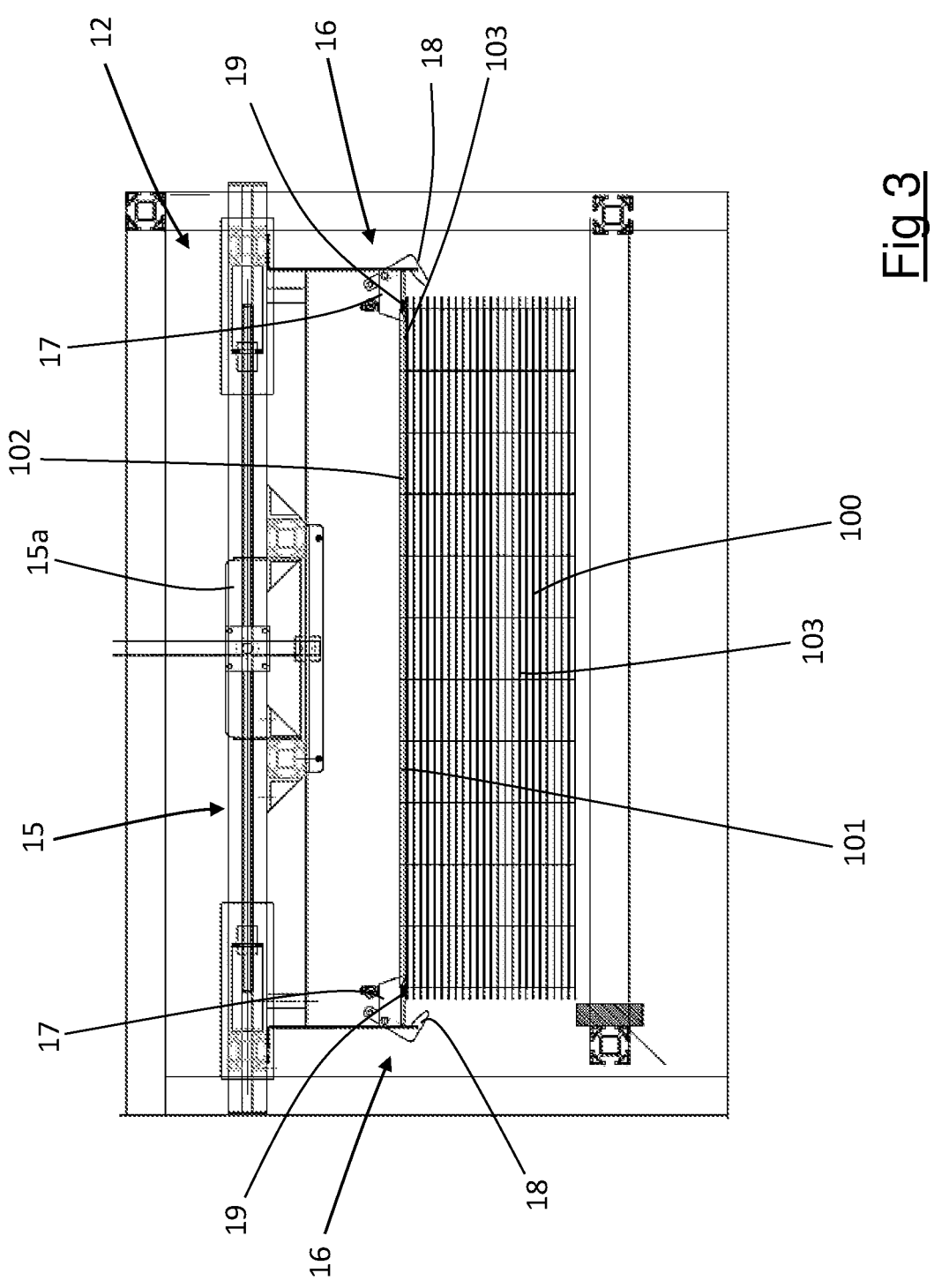

The grippers 16 reach a position adjacent to the separation sheet 103 made of flexible material placed higher up on the pallet 100, as shown schematically in FIG. 3. The adjacent position of the grippers 16 is achieved by lowering the transfer equipment 15 vertically and translating the grippers 16 horizontally (if necessary) towards the separation sheet 103 made of flexible material. The adjacent position is reached when the first gripper body 17 of each gripper 16 contacts an edge of the separation sheet 103 made of flexible material. The grippers 16 are in the open condition and the suction heads 19 are switched to the suction condition. The suction heads 19 constrain the separation sheet 103 made of flexible material (by suction) to the first bodies 17 of the grippers 16.

Figure 4:
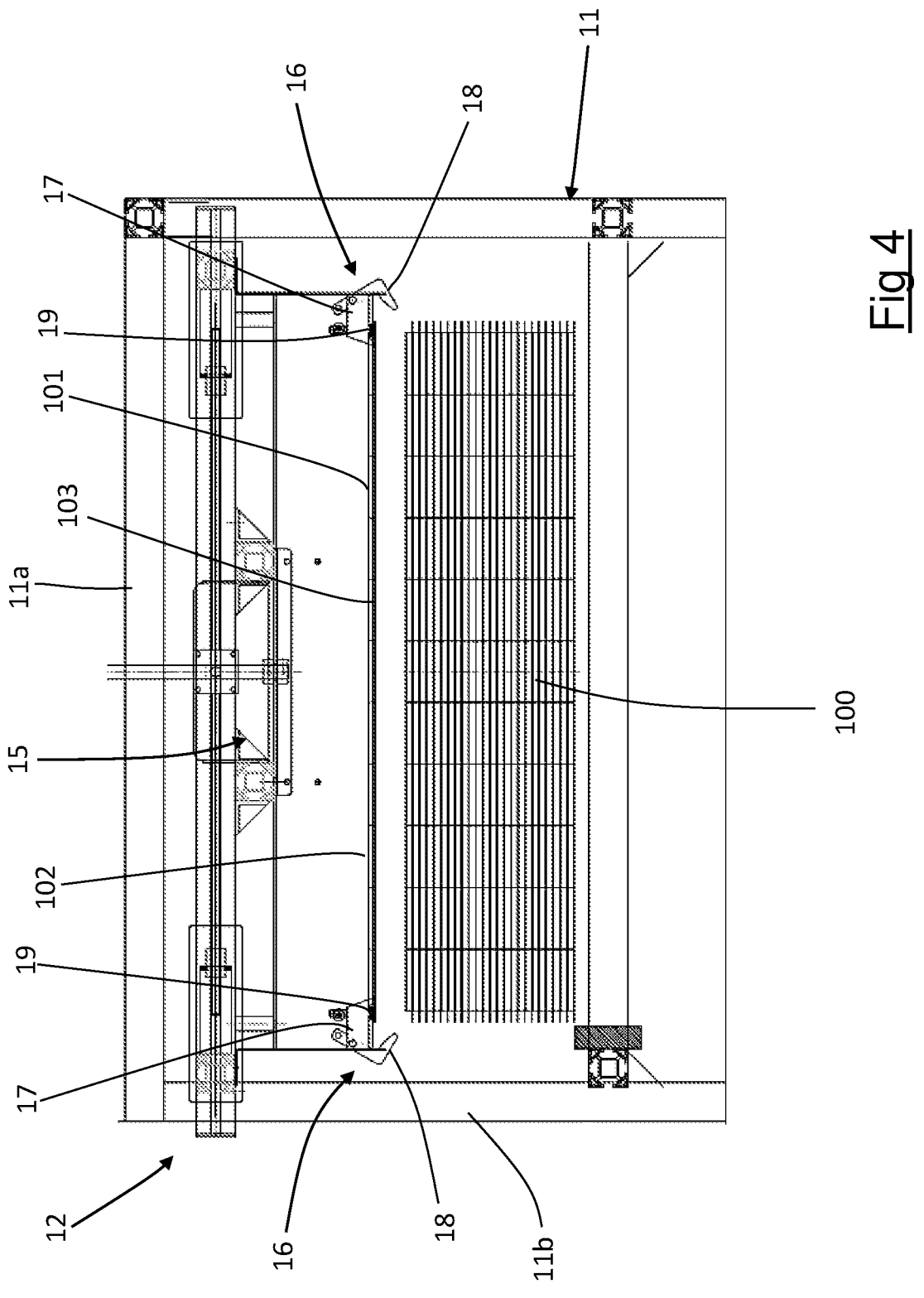

At this point, the transfer equipment 15 and the grippers 16 are translated vertically away from the pallet 100. Since the suction heads 19 constrain the separation sheet 103 made of flexible material to the first bodies 17 of the grippers 16, the separation sheet 103 made of flexible material is lifted along a lifting direction vertically directed away from the pallet 100, as shown schematically in FIG. 4. The grippers 16 are in the open condition and the containment walls 30 of the transfer equipment 15 surround the separation sheet 103 made of flexible material, preventing the products 100 resting on it from falling.

The lifting of the separation sheet 103 made of flexible material moves the lifted separation sheet 103 made of flexible material away from the separation sheet 103 made of flexible material immediately below and still contained in the pallet 100. This creates a handling space for the second gripper bodies 18 of the grippers 16, which can be rotated to place the grippers 16 in a closed condition, preventing the second gripper bodies 18 from accidentally intercepting the separation sheet 103 made of flexible material still on the pallet 100. Closing the grippers 16 causes the separation sheet 103 made of flexible material to be gripped at the gripping areas, as illustrated schematically in FIG. 5. The suction heads 19 can be switched to the release condition, since the suction action of the suction heads 19 is no longer necessary.

At this point, the grippers 16 are moved along a stretching direction DR to stretch the separation sheet 103 made of flexible material and remove any bending of the separation sheet 103 made of flexible material at a central area. The stretching direction DR is directed horizontally and first gripper heads 16 of each pair of grippers 16 are moved horizontally away from second grippers 16 of each pair of grippers 16.

With the grippers 16 in the closed condition, the transfer equipment is moved along the transfer direction DR to the unloading station 13. This is illustrated schematically in FIG. 1.

When the transfer equipment 15 reaches the unloading station 13 and is placed vertically above the support surface 21, the transfer equipment 15 is lowered vertically to deposit the separation sheet 103 made of flexible material on the support surface 21.

This is done by lowering the transfer equipment 15 (and with it the grippers 16) to a release distance from the support surface 21 such that the second gripper bodies 18 of the grippers 16 can be moved to open without the second gripper bodies 18 intercepting the support surface 21. When lowering the transfer equipment 15 to the release distance, or when the release distance is reached, the suction heads 19 are returned to the suction condition.

At this point, the grippers 16 are brought into the open condition to which a suspension position corresponds. In such a suspension position of the grippers 16, the separation sheet 103 made of flexible material remains above and spaced out from the support surface 21.

The transfer equipment 15 and the grippers 16 (in the open condition and with the suction heads in the suction condition) are lowered further down until the separation sheet 103 made of flexible material rests on the support surface 21. The suction heads 19 are placed in the release condition and the transfer equipment 15 with the grippers 16 is lifted vertically and sent back to the receiving station 12.

Figure 7:
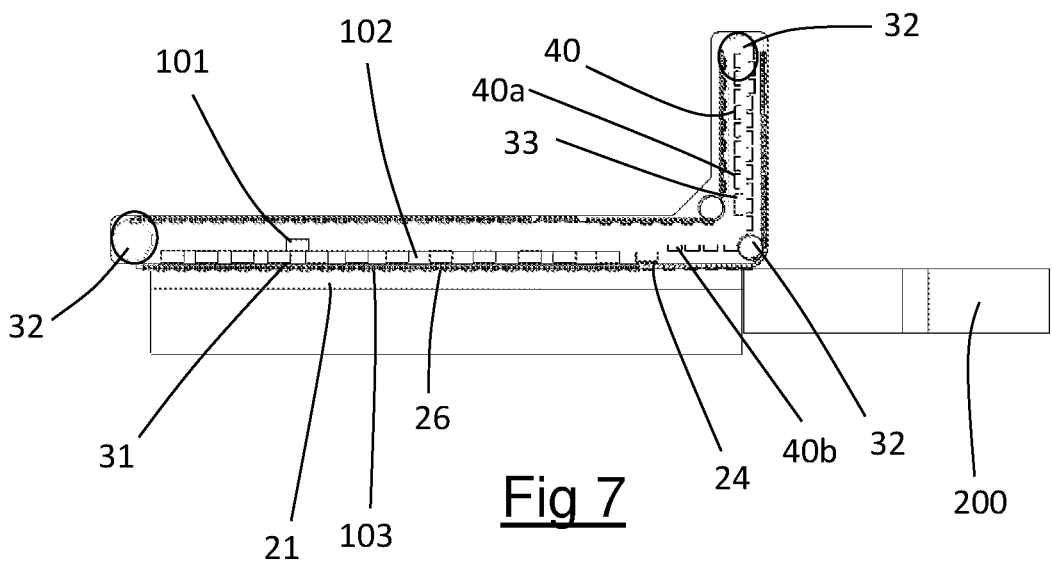
FIGS. 7 and 8 are schematic front views of a further detail of FIG. 1 in two different operating conditions.

This is done with the main pusher 24 located in the first portion 28 of the return section 27 of the first path 25. This operation is also performed with the secondary pusher 33 located in the first portion 37 of the return section 36 of the second path 34. This operation is also carried out with the covering body 40 completely arranged in the first portion 44 of the return section 43 of the third path 41, as schematically illustrated in FIG. 7. In this way, the main pusher 24, the secondary pusher 33 and the covering body 40 do not interfere with separation sheet 103 made of flexible material.

The retaining unit 39 is activated to retain a portion of the separation sheet 103 made of flexible material on the support surface 21.

FIG. 9 illustrates in a schematic view from above the separation sheet 103 made of flexible material resting on the support surface 21 of the unloading station 13 with the products 101 placed on the separation sheet 103 made of flexible material (left part of the figure), and a further separation sheet 103 made of flexible material with a respective layer 102 of products placed on said separation sheet 103 made of flexible material ready to be picked up by the receiving station 12 (right side of the figure).

FIG. 7 shows the unloading station 13, in a schematic side view, with the separation sheet 103 made of flexible material resting on the support surface 21 and with the products 101 placed on the separation sheet 103 made of flexible material. As schematically illustrated in FIG. 7, it may happen that a product 101 is superimposed on the layer 102 of products during the transfer of the separation sheet 103 made of flexible material from the receiving station 12 to the unloading station 13.

In this case, and even if there is no product 101 superimposed on the layer 102, the layer 102 of products is pushed towards the conveyor 200.

Figure 8:
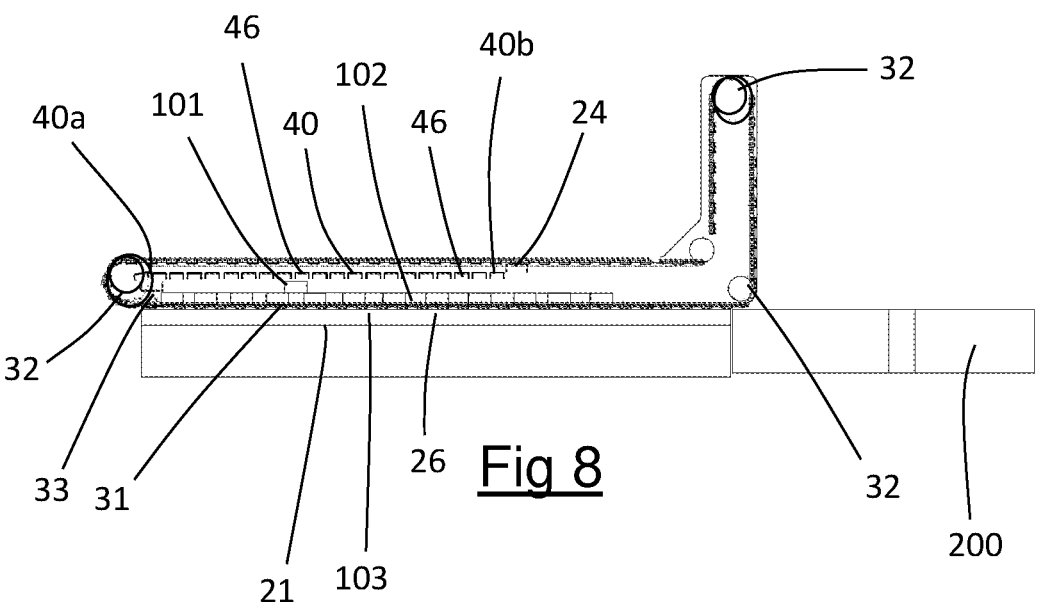

This operation involves bringing the secondary pusher 33 to the starting end 35*a* of the active section 35 of the second transport path 34. At the same time, the first end 40*a* of the covering body 40 is brought into the starting end 42*a* of the active section 42 of the third path 41 (as illustrated schematically in FIG. 8. The main pusher is located in the return section 27 of the first path 25.

The secondary pusher 33 is advanced along the active section 35 of the second transport path 34. At the same time, the first end 40*a* of the covering body 40 advances along the active section 42 of the third path 41. As shown schematically in FIG. 10, during this operation the covering body 40 partially covers the layer 102 of products 101 placed on the separation sheet 103 made of flexible material, and the secondary pusher 33 intercepts any products 101 superimposed on the layer 102 by pushing them in the direction towards the conveyor 200.

The secondary pusher 33 has a dimension, in the direction parallel to the transfer direction DT, which is larger than the dimension of the separation sheet 103 made of flexible material in the same direction. Similarly, the main pusher 24 has a dimension, in the direction parallel to the transfer direction DT, greater than the dimension of the separation sheet 103 made of flexible material in the same direction. The covering body 40 has a dimension, in the direction parallel to the transfer direction DT, greater than the dimension of the separation sheet 103 made of flexible material in the same direction.

The active section 26 of the first path 25 has an extension greater than or equal to the size of the separation sheet 103 made of flexible material in the direction of the main pusher 24 when it travels along the active section 26. The active section 35 of the second path 34 has an extension greater than or equal to the size of the separation sheet 103 made of flexible material in the direction of travel of the secondary pusher 33 when it travels along the active section 35. The active section 42 of the third path 41 has an extension greater than or equal to the size of the separation sheet 103 made of flexible material in the direction of travel of the covering body 40 when it travels along the active section 42.

Figure 11:
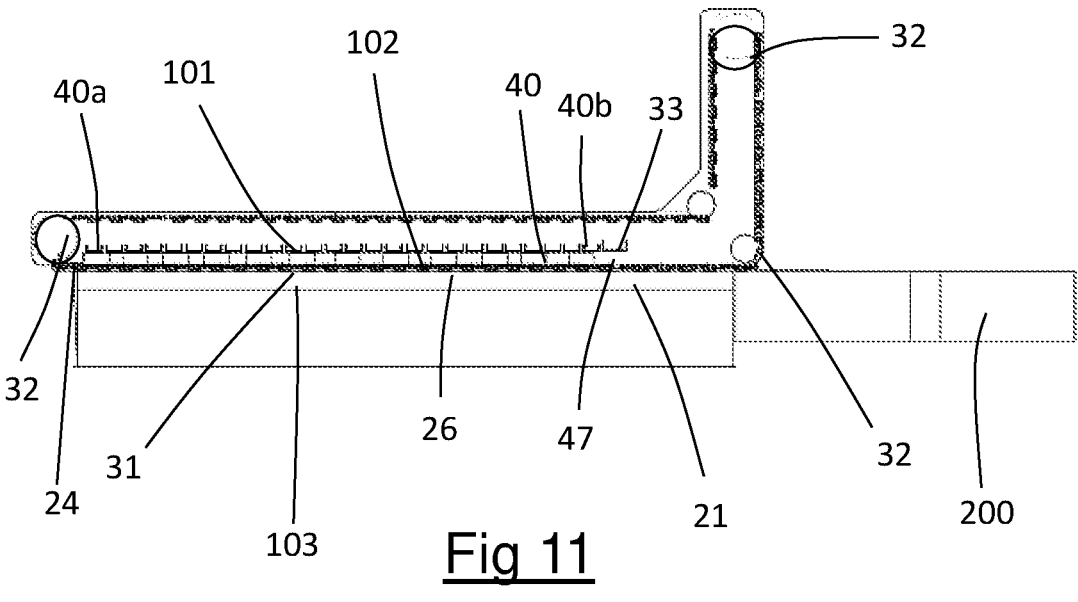
FIGS. 11 and 12 are schematic front views of the further detail of FIG. 1 in two further different operating positions.
Figure 13:
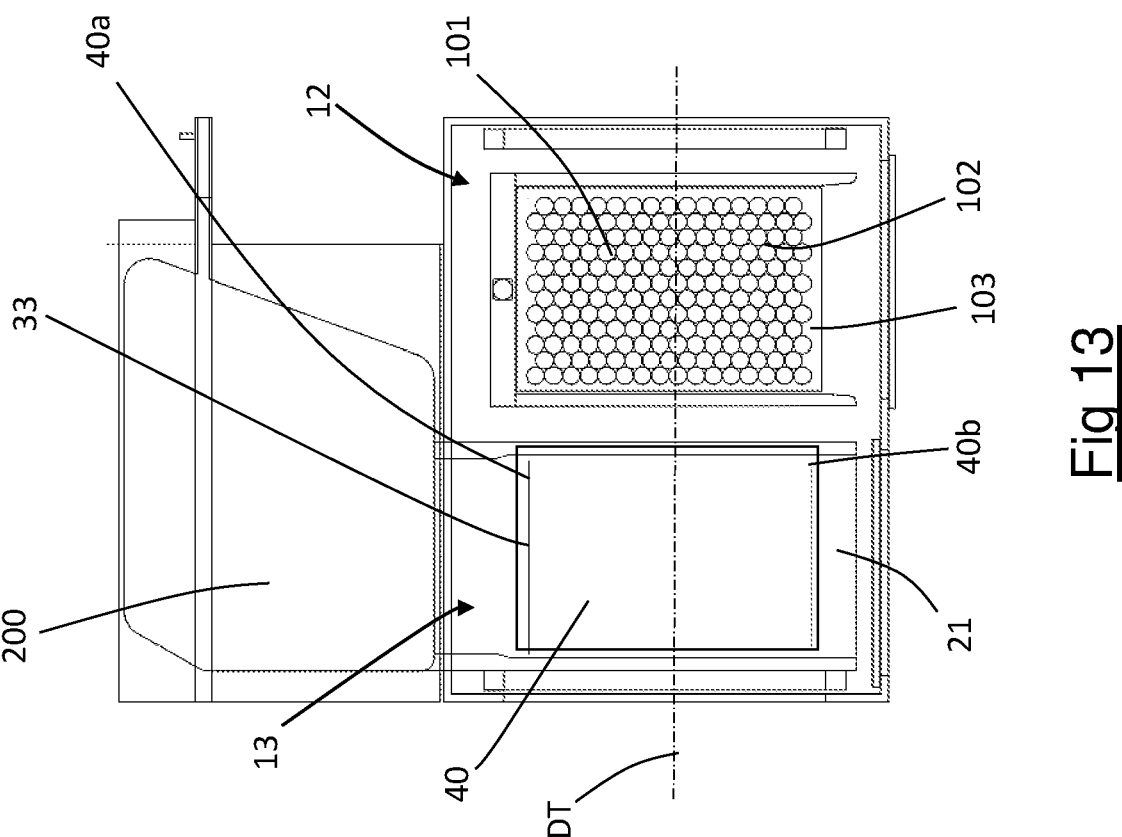

When the secondary pusher 33 reaches the end 35*b* of the active section 35 of the second path 34, the covering body 40 completely covers the layer 102 of products 101 placed on the separation sheet 103 made of flexible material, as schematically illustrated in FIG. 13. This creates the containment channel 47 for the products 101. When the secondary pusher 33 reaches the finishing end 35*b* of the active section 35 of the second path 34, the main pusher 24 reaches the beginning end 26*a* of the active section 26 of the first path 25, as depicted in FIG. 11.

Figure 14:
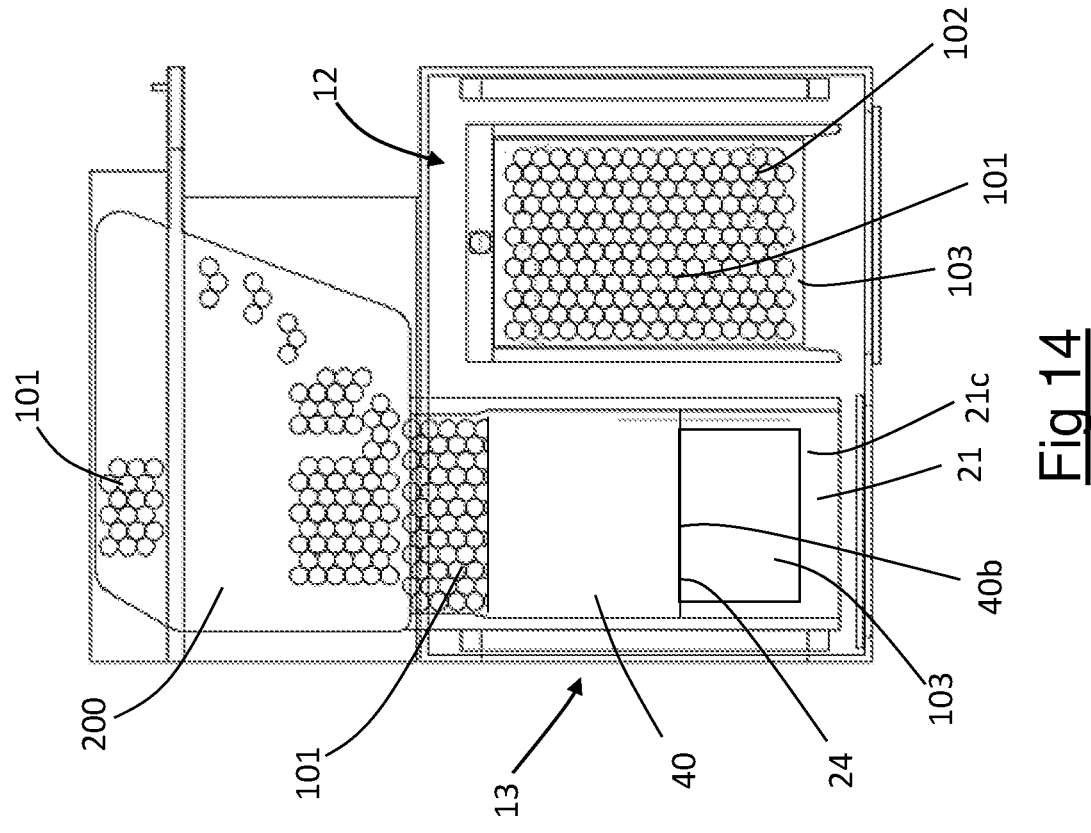
FIGS. 13 and 14 are schematic views from above of the device of FIG. 1 in the operating positions of FIGS. 11 and 12, respectively.

The main pusher 24 then begins to travel along the active section 26 of the first path 25. When the main pusher 24 travels along the active section 26 of the first path 25, the main pusher 24 pushes the layer 102 of products 101 off the separation sheet 103 made of flexible material in a direction facing towards the end 26*b* of the active section 26 of the first path 25. When the main pusher 24 travels along the active section 26 of the first path 25, the main pusher 24 pushes the layer 102 of products 101 into the containment channel 47 towards the conveyor 200, as schematically illustrated in FIG. 14.

Figure 12:
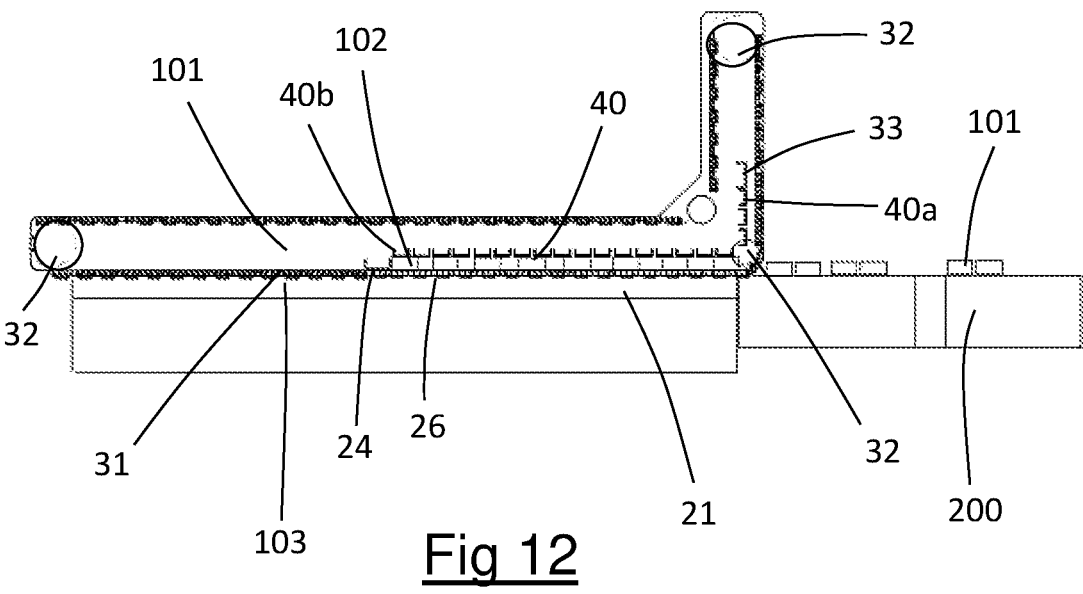

When the main pusher 24 travels along the active section 26 of the first path 25, the secondary pusher 33 travels along the return section 36 of the second path 34. When the main pusher 24 travels along the active section 26 of the first path 25, the first end 40*a* of the covering body 40 travels along the return section 43 of the third path 41. When the main pusher 24 travels along the active section 26 of the first path 25, the second end 40*b* of the covering body 40 travels along the active section 42 of the third path 41, as schematically illustrated in FIG. 12.

Figure 15:
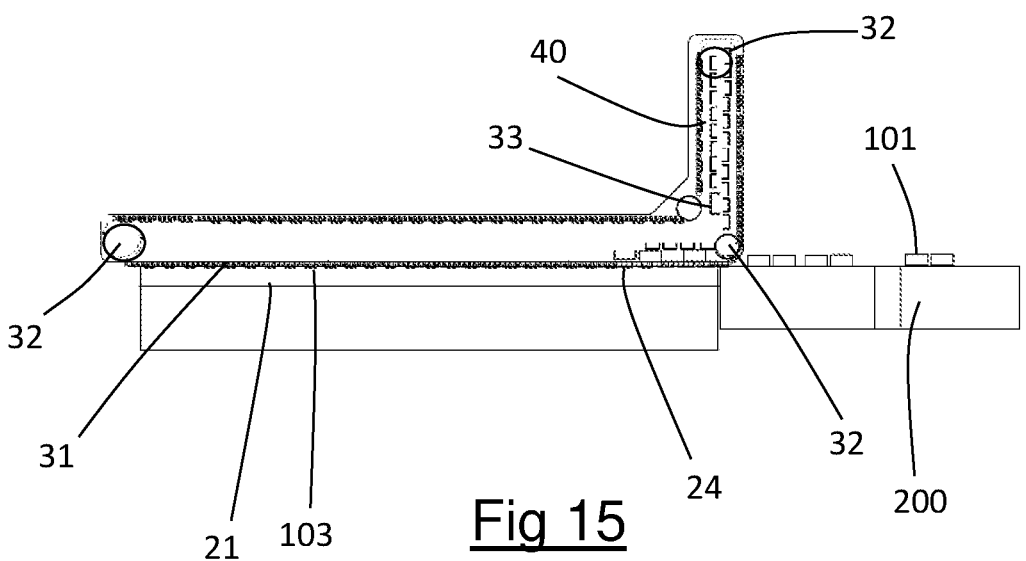
FIG. 15 is a schematic front view of the further detail of FIG. 1 in a further operating position.

The main pusher 24 reaches the finishing end 26*b* of the active section 26 of the first path 25, as shown schematically in FIG. 15. The layer 102 of products 101 is completely removed from the separation sheet 103 made of flexible material. When the main pusher 24 reaches the finishing end 26*b* of the active section 26 of the first path 25, the secondary pusher 33 is in the return section 36 of the second path 34. When the main pusher 24 reaches the finishing end 26*b* of the active section 26 of the first path 25, the second end 40*b* of the covering body 40 reaches the finishing end 42*b* of the active section 42 of the third path 41. When the main pusher 24 reaches the finishing end 26*b* of the active section 26 of the first path 25, the first end 40*a* of the covering body 40 travels along the return section 43 of the third path 41.

Figure 17:
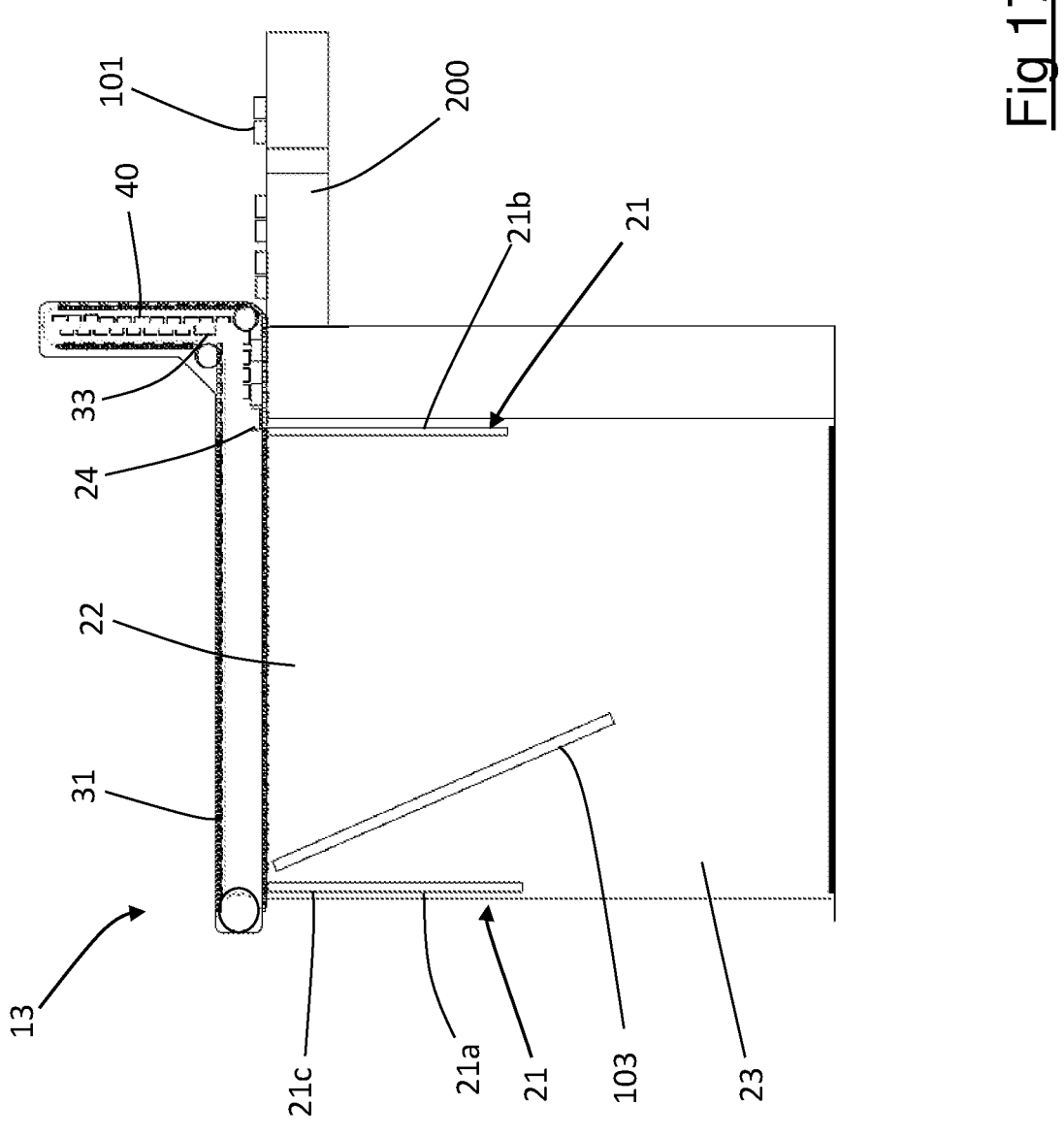
FIG. 17 is a schematic front view of the detail of FIG. 15 in a different operating position.

When the layer 102 of products 101 is completely removed from the separation sheet 103 made of flexible material, the support surface 21 is placed in the open condition and the retaining unit 39 is deactivated. This causes the separation sheet 103 made of flexible material to fall into the collection compartment 23 of the unloading station 13, as schematically illustrated in FIG. 17. During this operation, the main pusher 24 is placed in the first portion 28 of the return section 27 of the first path 25. This operation is also performed with the secondary pusher 33 located in the first portion 37 of the return section 36 of the second path 34. This operation is also carried out with the covering body 40 completely arranged in the first portion 44 of the return section 43 of the third path 41, as schematically illustrated in FIG. 17. In this way, the main pusher 24, the secondary pusher 33 and the covering body 40 do not interfere with the separation sheet 103 made of flexible material falling through the unloading opening 22.

Obviously, a person skilled in the art, in order to satisfy specific and contingent needs, can make numerous modifications and variations to the invention described above while remaining within the scope of protection defined by the following claims.

The invention claimed is:

1. A device for picking up products stacked on pallets comprising:

a receiving station configured to receive a pallet;

an unloading station comprising a support surface;

transfer equipment movable at least between the receiving station and the unloading station and configured to pick up a separation sheet made of flexible material from the receiving station and deposit it in the unloading station;

said transfer equipment comprising a plurality of grippers, wherein each gripper is configurable between a closed condition in which it grips the separation sheet made of flexible material and an open condition in which it releases the separation sheet made of flexible material;

a main pusher placed in the unloading station movable along the support surface following an active section of a first path;

wherein each of the plurality of grippers comprises a first gripper body and a second gripper body movable towards each other to achieve said closed condition and movable away from each other to achieve said open condition; said first gripper body comprising at least one suction head switchable between a suction condition in which it adheres to the separation sheet made of flexible material and a release condition in which it does not adhere to the separation sheet made of flexible material.

2. The device according to claim 1, wherein when said transfer equipment is in the receiving station, said plurality of grippers are movable between a position distanced from the separation sheet made of flexible material and a position adjacent to the separation sheet made of flexible material, wherein in said position adjacent to the separation sheet the plurality of grippers are in the open condition and the suction head of the first gripper body of each gripper is placed in the suction condition.

3. The device according to claim 2, wherein when in said position adjacent to the separation sheet the plurality of grippers are movable in a lifting direction until they reach a closing start position; said plurality of grippers being placed in the closed condition in said closing start position.

4. The device according to claim 1, wherein said support surface comprises a retaining unit configured to retain the separation sheet made of flexible material on the support surface.

5. The device according to claim 1, wherein said main pusher is arranged parallel to said support surface and is spaced in a perpendicular direction from said support surface by a first distance (D1) when it travels along said active section.

6. The device according to claim 5, comprising a secondary pusher movable along the support surface following an active section of a second path, wherein said active section of the second path is parallel to the active section of the first path, and wherein said secondary pusher, when travelling along the active section of the second path, is spaced in a perpendicular direction from the support surface by a second distance (D2) greater than said first distance (D1).

7. The device according to claim 6, wherein the active section of the first path extends between a starting end and a finishing end and wherein said active section of the second path extends between a starting end and a finishing end; said secondary pusher being in said finishing end of the active section of the second path when the main pusher is in said starting end of the active section of the first path.

8. The device according to claim 7, comprising a covering body placed parallel to the support surface and spaced in a perpendicular direction from the support surface by a third distance (D3) when the secondary pusher is at said finishing end of the active section of the second path.

9. The device according to claim 8, wherein said covering body is movable along the support surface following an active section of a third path; said first path, said second path and said third path extending in a closed loop and being parallel to each other.

10. A device according to claim 1, wherein said plurality of grippers, when in the closed condition, are movable along a horizontally directed stretching direction (DR).

11. The device according to claim 10, wherein, when said plurality of grippers is in the closed condition, first gripper heads of each pair of grippers are moved horizontally away from second grippers of each pair of grippers.

12. A device for picking up products stacked on pallets comprising:

a receiving station configured to receive a pallet;

an unloading station comprising a support surface;

transfer equipment movable at least between the receiving station and the unloading station and configured to pick up a separation sheet made of flexible material from the receiving station and deposit it in the unloading station;

said transfer equipment comprising a plurality of grippers, wherein each gripper is configurable between a closed condition in which it grips the separation sheet made of flexible material and an open condition in which it releases the separation sheet made of flexible material;

a main pusher placed in the unloading station movable along the support surface following an active section of a first path;

wherein said main pusher is arranged parallel to said support surface and is spaced in a perpendicular direction from said support surface by a first distance (D1) when it travels along said active section;

a secondary pusher movable along the support surface following an active section of a second path, wherein said active section of the second path is parallel to the active section of the first path, and wherein said secondary pusher, when travelling along the active section of the second path, is spaced in a perpendicular direction from the support surface by a second distance (D2) greater than said first distance (D1).

* * * * *